G. T. CARPENTER.
PIPE FOR CONDUITS OR DRAINS.
APPLICATION FILED OCT. 11, 1912.
1,054,904.
Patented Mar. 4, 1913.
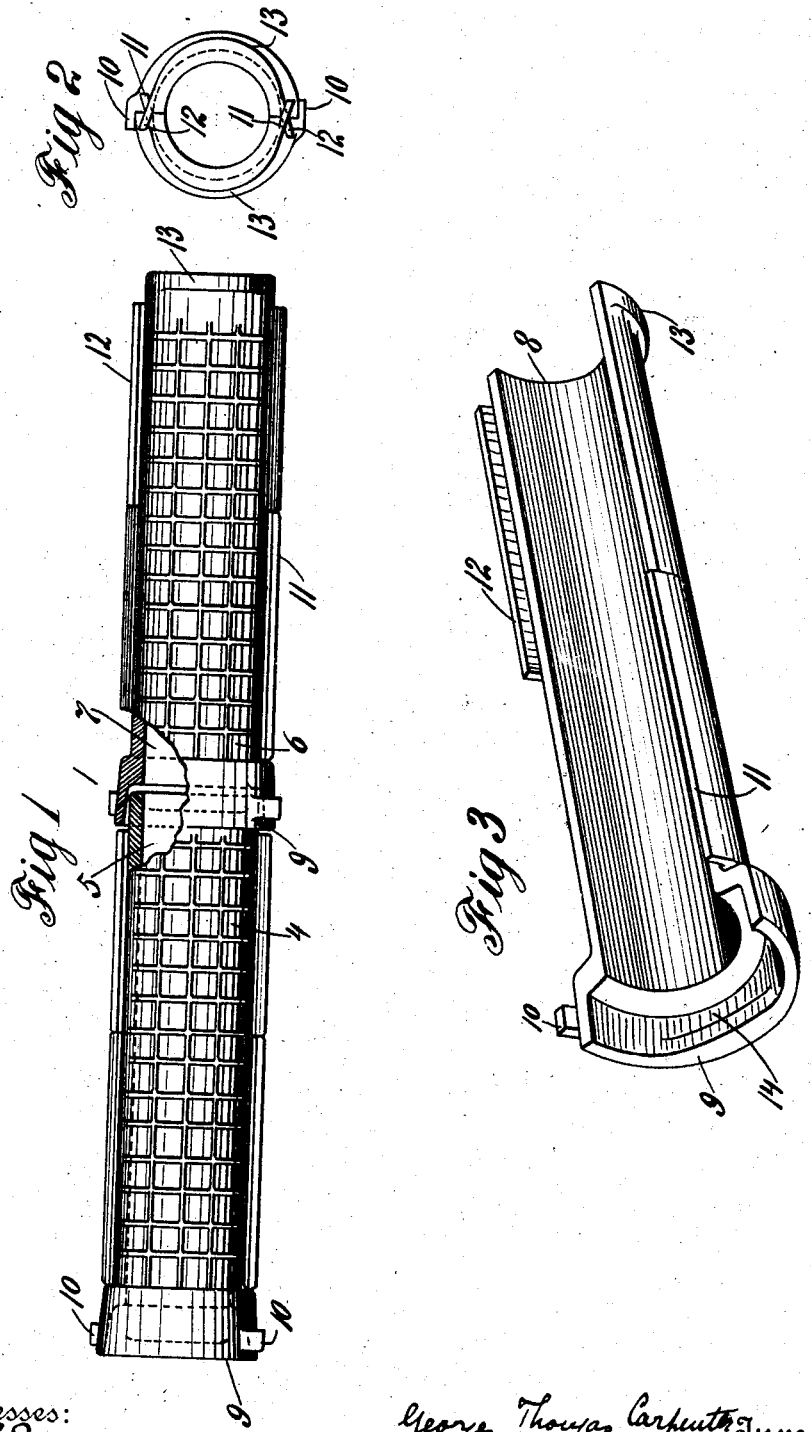

UNITED STATES PATENT OFFICE.

GEORGE THOMAS CARPENTER, OF CRESTLINE, OHIO, ASSIGNOR TO THE BURCH PLOW WORKS CO., OF CRESTLINE, OHIO, A CORPORATION.

PIPE FOR CONDUITS OR DRAINS.

1,054,904.        Specification of Letters Patent.        Patented Mar. 4, 1913.

Application filed October 11, 1912. Serial No. 725,140.

*To all whom it may concern:*

Be it known that I, GEORGE THOMAS CARPENTER, a citizen of the United States, residing at Crestline, in the county of Crawford and State of Ohio, have invented certain new and useful Improvements in Pipes for Conduits or Drains, of which the following is a specification, reference being had therein to the accompanying drawing.

My invention relates to improvements in pipes for conduits or drains and has particular reference to what is generally known as culvert.

According to my invention the pipe is made in sections which are formed in upper and lower interchangeable and interlocking halves.

Referring to the accompanying drawings, Figure 1 shows two lengths of pipe each of which is composed of upper and lower halves or sections 4—5 and 6—7. Fig. 2 is an end view looking from right to left at Fig. 1, and Fig. 3 is a perspective view of one of the sections.

By referring now to Fig. 3 it will be observed that each section is provided with an inner end 8 and an outer end 9 and that each outer end is provided with a projecting lug 10 at one side, also that the edges at opposite sides and opposite ends project as indicated at 11 and 12. It will be further observed that the inner end 8 is provided with a projecting ridge 13 which extends partly around the circumference of the periphery, while the outer end is provided with a recess 14 adapted to receive the ridge 13 when the pipe sections are coupled or placed in position as shown in Figs. 1 and 2. In addition to the interlocking provided by the ridges and grooves at the ends of the sections it will be observed that the projecting sides 11 and 12 also interlock to prevent lateral or transverse displacement, and that the projecting lugs 10 further serve to keep the adjoining ends of the sections in position. With this form of pipe each section or half is exactly the same and is interchangeable. The projecting edges 11 and 12 of each section extend tangentially of the outer surface as shown to better advantage in Fig. 2, so that the projecting edges of one section cross the projecting edges of the adjoining section at a different angle to insure substantial abutment.

When the pipe is being placed in position the lower half is first laid down after which the lower half of the adjoining section is laid in position. That is to say, the inner or male end is placed upon the outer or female end of the other section allowing the ridges and grooves to interlock, after which the upper portion of the first lower section is then placed in position, and so on until the line is completed.

Of course it will be understood that various modifications may be made without departing from the spirit of the invention as set forth in the claims.

I claim:

1. Piping having upper and lower longitudinal sections, the ends of one pair of sections adapted to fit within the ends of the other pair of sections, one half of the edges at opposite sides and opposite ends of one section being adapted to overlap one half the edges at opposite sides and opposite ends of the other section, said sections being interchangeable.

2. Piping having upper and lower longitudinal sections, the ends of one pair of sections adapted to fit within the ends of the other pair of sections, one half of the edges at opposite sides and opposite ends of one section being adapted to overlap one half the edges at opposite sides and opposite ends of the other section, the outer end of each of said sections being provided with a lug adapted to engage the flange of the outer end of the adjacent section.

In testimony whereof I affix my signature in presence of two witnesses.

GEORGE THOMAS CARPENTER.

Witnesses:
J. L. MORROW,
C. M. BABST.

Copies of this patent may be obtained for five cents each, by addressing the "Commissioner of Patents, Washington, D. C."